US008917245B2

(12) United States Patent
Nagai (10) Patent No.: US 8,917,245 B2
(45) Date of Patent: Dec. 23, 2014

(54) INFORMATION PROCESSING APPARATUS AND CONTROL METHOD THEREOF

(75) Inventor: Hiroyuki Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 12/433,772

(22) Filed: Apr. 30, 2009

(65) Prior Publication Data

US 2009/0289911 A1    Nov. 26, 2009

(30) Foreign Application Priority Data

May 20, 2008    (JP) ................................. 2008-132358

(51) Int. Cl.
*G06F 3/041*    (2006.01)

(52) U.S. Cl.
CPC ...... *G06F 3/041* (2013.01); *G06F 2203/04104* (2013.01)
USPC .......................................... 345/173; 345/174

(58) Field of Classification Search
CPC ..... G06F 3/041; G06F 3/0412; G06F 3/0416; G06F 3/044
USPC ................................................. 345/173–179
See application file for complete search history.

(56) References Cited

U.S. PATENT DOCUMENTS

| | | | |
|---|---|---|---|
| 5,483,261 A | 1/1996 | Yasutake | 345/173 |
| 6,259,436 B1 * | 7/2001 | Moon et al. | 345/173 |
| 6,323,846 B1 | 11/2001 | Westerman et al. | |
| 6,943,779 B2 | 9/2005 | Satoh | 345/173 |
| 7,015,894 B2 | 3/2006 | Morohoshi | 345/156 |
| 7,046,235 B2 | 5/2006 | Katoh | |
| 7,138,983 B2 | 11/2006 | Wakai et al. | 345/173 |
| 7,176,904 B2 | 2/2007 | Satoh | 345/173 |
| 7,307,623 B2 | 12/2007 | Enomoto | 345/173 |
| 2005/0052427 A1 * | 3/2005 | Wu et al. | 345/173 |
| 2006/0019752 A1 * | 1/2006 | Ohta | 463/43 |
| 2006/0284858 A1 * | 12/2006 | Rekimoto | 345/173 |
| 2007/0152976 A1 * | 7/2007 | Townsend et al. | 345/173 |
| 2007/0229471 A1 | 10/2007 | Kim et al. | 345/173 |

(Continued)

FOREIGN PATENT DOCUMENTS

| | | |
|---|---|---|
| JP | 01-142969 | 6/1989 |
| JP | 7-182101 | 7/1995 |

(Continued)

OTHER PUBLICATIONS

Japanese Office Action dated Apr. 27, 2012 in Japanese Application No. 2008-132358.

*Primary Examiner* — Alexander Eisen
*Assistant Examiner* — Nelson Lam
(74) *Attorney, Agent, or Firm* — Fitzpatrick, Cella, Harper & Scinto (57) ABSTRACT

An information processing apparatus that has a touch panel that is able to detect a plurality of touch input positions concurrently extracts a combination consisting of a predetermined number of touch input positions from a plurality of touch input positions that concurrently exist on the touch panel, and based on a positional relationship of the touch input positions constituting the combination that is extracted, determines whether or not the combination is an area designation operation of a single user. When it is determined that the combination is an area designation operation, the information processing apparatus specifies a designated area based on touch input positions of the combination, and acquires a selected object based on a relationship between the specified area and a display position of the object.

18 Claims, 7 Drawing Sheets

(56) References Cited

U.S. PATENT DOCUMENTS

| | | |
|---|---|---|
| 2007/0262965 A1 | 11/2007 | Hirai et al. |
| 2008/0088602 A1* | 4/2008 | Hotelling ............... 345/173 |
| 2008/0165132 A1* | 7/2008 | Weiss et al. ............ 345/173 |
| 2008/0172633 A1* | 7/2008 | Jeon et al. .............. 715/810 |
| 2008/0180406 A1* | 7/2008 | Han et al. ............... 345/173 |
| 2008/0211766 A1* | 9/2008 | Westerman et al. .... 345/156 |
| 2008/0309630 A1* | 12/2008 | Westerman ............. 345/173 |
| 2009/0085877 A1* | 4/2009 | Chang et al. ........... 345/173 |
| 2009/0135162 A1* | 5/2009 | Van De Wijdeven et al. 345/175 |
| 2009/0213083 A1* | 8/2009 | Dicker et al. ........... 345/173 |
| 2010/0141680 A1* | 6/2010 | Nashida et al. ........ 345/642 |
| 2011/0175827 A1* | 7/2011 | Bogue ..................... 345/173 |

FOREIGN PATENT DOCUMENTS

| | | |
|---|---|---|
| JP | 7230352 A | 8/1995 |
| JP | 7306752 A | 11/1995 |
| JP | 2000-163444 | 6/2000 |
| JP | 2000222130 A | 8/2000 |
| JP | 2001-265475 | 9/2001 |
| JP | 2001-290585 | 10/2001 |
| JP | 2002-287903 | 10/2002 |
| JP | 2003-122506 | 4/2003 |
| JP | 2003-173237 | 6/2003 |
| JP | 2003-256142 | 9/2003 |
| JP | 2003337659 A | 11/2003 |
| JP | 2003346162 A | 12/2003 |
| JP | 2005322088 A | 11/2005 |
| JP | 2005346354 A | 12/2005 |
| JP | 2006072854 A | 3/2006 |
| JP | 2007-184008 | 7/2007 |
| JP | 2007184007 A | 7/2007 |
| JP | 2007-272904 | 10/2007 |

\* cited by examiner

INFORMATION PROCESSING APPARATUS AND CONTROL METHOD THEREOF

BACKGROUND OF THE INVENTION

1. Field of the Invention

The present invention relates to an information processing apparatus that provides a user interface utilizing a touch panel, and a control method thereof.

2. Description of the Related Art

User interfaces that utilize a touch panel that accepts an operation from a user on a screen that is presented to the user are in widespread general use. In recent years, a touch panel (hereafter, referred to as a "multi-touch panel") that can detect touch positions at multiple points has also been proposed and has started to be utilized. By utilizing a multi-touch panel, it is possible to recognize a gesture made by multiple fingers of a user, and a relationship between multiple fingers can be made to serve a new purpose. For example, it is possible to give an instruction such as enlargement, reduction, or rotation of an object by using multiple fingers (see Japanese Patent Laid-Open No. 2001-290585). It is also possible to give an instruction that selects an object by surrounding the object at multiple points (see Japanese Patent Laid-Open No. 2000-163444, Japanese Patent Laid-Open No. 2003-256142, Japanese Patent Laid-Open No. 01-142969, and Japanese Patent Laid-Open No. 2007-272904). Since a selection operation that surrounds an object at multiple points, particularly a selection operation performed by surrounding an object with fingers of one hand, is close to an action performed with respect to a real entity, this kind of user interface is easy for users to intuitively understand.

However, conventionally, in a case in which multiple users concurrently perform operations on a multi-touch panel, there is the problem that the apparatus cannot distinguish between operations of individual users, and misrecognizes a selection operation of a region based on designated points of multiple users. Although this is not a problem with a device that is based on the premise of utilization by an individual user, for example, in the case of a comparatively large panel that is utilized in a meeting by multiple people, if the panel misrecognizes a fact that the panel has been touched concurrently by multiple people as being a region selection, concurrent operations by multiple people are not possible. Further, even in the case of an operation by a single user, when separate operations are performed by the user's two hands, there is the problem that the apparatus misrecognizes the separate operations as a single region selection.

SUMMARY OF THE INVENTION

According to one aspect of the present invention there is provided an information processing method that enables more reliable identification of an operation to select a region and other operations on a multitouch panel.

According to another aspect of the present invention, there is provided an information processing apparatus, comprising:
a touch panel that is able to detect a plurality of touch input positions concurrently;
an extraction unit configured to extract a combination consisting of a predetermined number of touch input positions from a plurality of touch input positions that concurrently exist on the touch panel;
a determination unit configured to determine whether or not a combination that is extracted by the extraction unit is an area designation operation of a single user based on a positional relationship among touch input positions comprising the combination; and
a decision unit configured to decide a designated area based on touch input positions of the combination in a case in which it is determined that the combination is the area designation operation.

Also according to another aspect of the present invention, there is provided a control method of an information processing apparatus equipped with a touch panel that is able to detect a plurality of touch input positions concurrently, the control method comprising:
extracting a combination consisting of a predetermined number of touch input positions from a plurality of touch input positions that concurrently exist on the touch panel;
determining whether or not a combination that is extracted in the extraction step is an area designation operation of a single user based on a positional relationship of touch input positions comprising the combination; and
deciding a designated area based on touch input positions of the combination in a case in which it is determined that the combination is the area designation operation.

Further features of the present invention will become apparent from the following description of exemplary embodiments with reference to the attached drawings.

DESCRIPTION OF THE EMBODIMENTS

Hereafter, preferred embodiments of the present invention are described with reference to the attached drawings.

Figure 1:
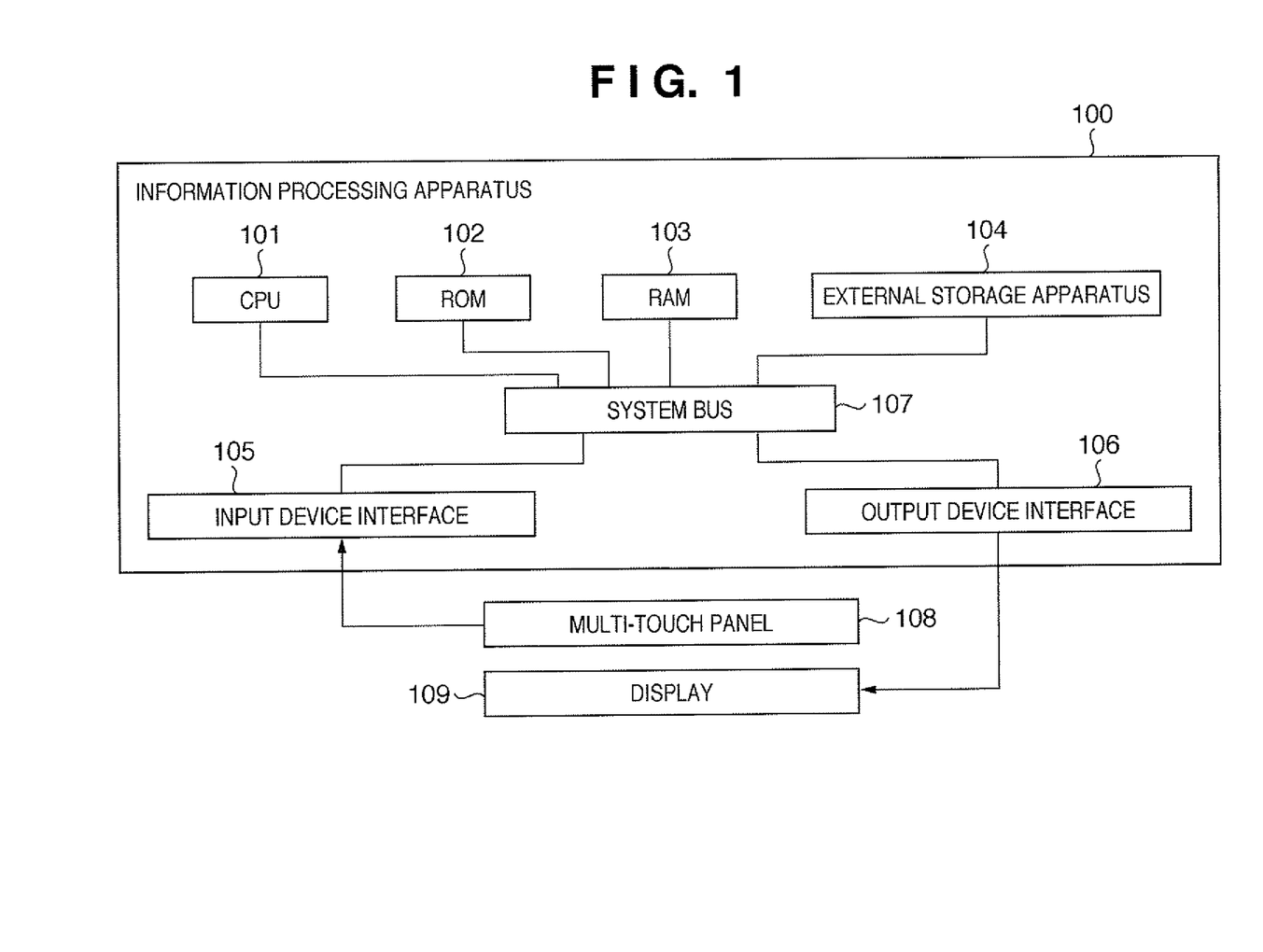
FIG. 1 is a block diagram of the configuration of an information processing apparatus.

The configuration of an information processing apparatus 100 of the present embodiment is described below with reference to the block diagram shown in FIG. 1. Reference numeral 101 denotes a central processing unit (CPU) that controls the entire information processing apparatus 100. Reference numeral 102 denotes a read only memory (ROM) that stores computer programs and parameters that do not need modifying. Reference numeral 103 denotes a random access memory (RAM) that temporarily stores computer programs and data supplied from an external apparatus or the like. Reference numeral 104 denotes an external storage apparatus, and includes a hard disk or a memory card that is fixedly installed in the information processing apparatus 100, or a storage medium that is detachable from the information processing apparatus 100. Examples of the detachable storage medium include an optical disk such as a flexible disk (FD) or a compact disk (CD), a magnetic or optical card, an IC card, and a memory card.

Reference numeral 108 denotes a multi-touch panel that is a touch panel that is able to concurrently detect a plurality of touch input positions. Reference numeral 105 denotes an input device interface this is an interface with a device that accepts user operations from the multi-touch panel 108 and inputs data. Reference numeral 106 denotes an output device interface that is an interface for displaying data held by the information processing apparatus 100 or supplied data on a display 109 that is arranged in an overlapping manner with respect to the multi-touch panel 108.

Reference numeral 107 denotes a system bus that communicably connects each of the units 101 to 106. The input device interface 105 and the output device interface 106 are connected to the multi-touch panel 108 and the display 109, respectively. According to the present embodiment, an information processing program code for implementing the contents of the present invention is stored in the external storage apparatus 104, is loaded to the RAM 103, and is executed by the CPU 101. A user performs an operation using the multi-touch panel 108, and obtains a response from the display 109. In this connection, the information processing program code may also be stored in the ROM 102.

Figure 2:
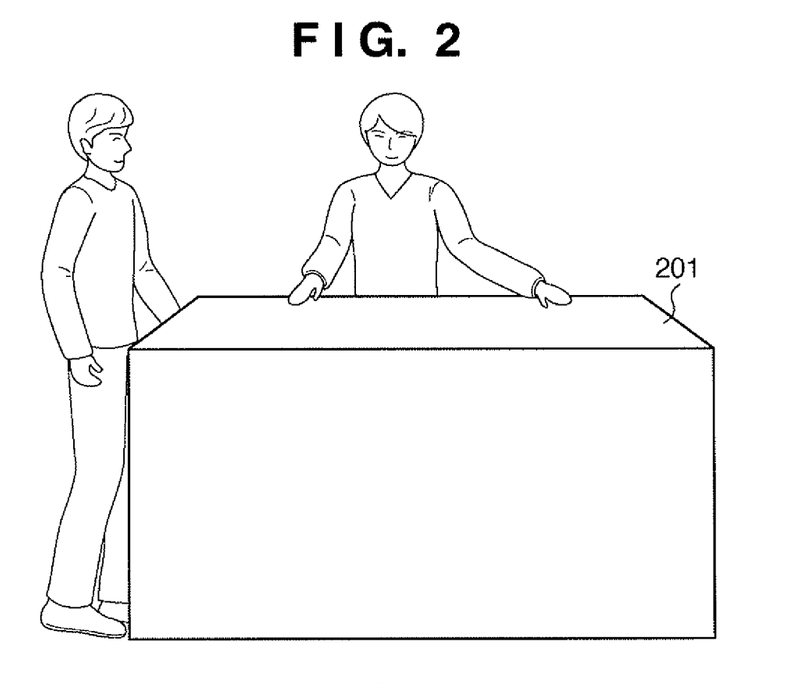
FIG. 2 is an external view of the information processing apparatus.

FIG. 2 is an external view of the information processing apparatus 100. The information processing apparatus 100 has, for example, a table shape, and a top plate 201 thereof serves as the multi-touch panel 108. Multiple users can operate the multi-touch panel 108, and can observe display contents of the display 109 through the multi-touch panel 108. It should be noted that the present invention is not limited to the shape of this apparatus. For example, the present invention may have the shape of a whiteboard.

Figure 3:
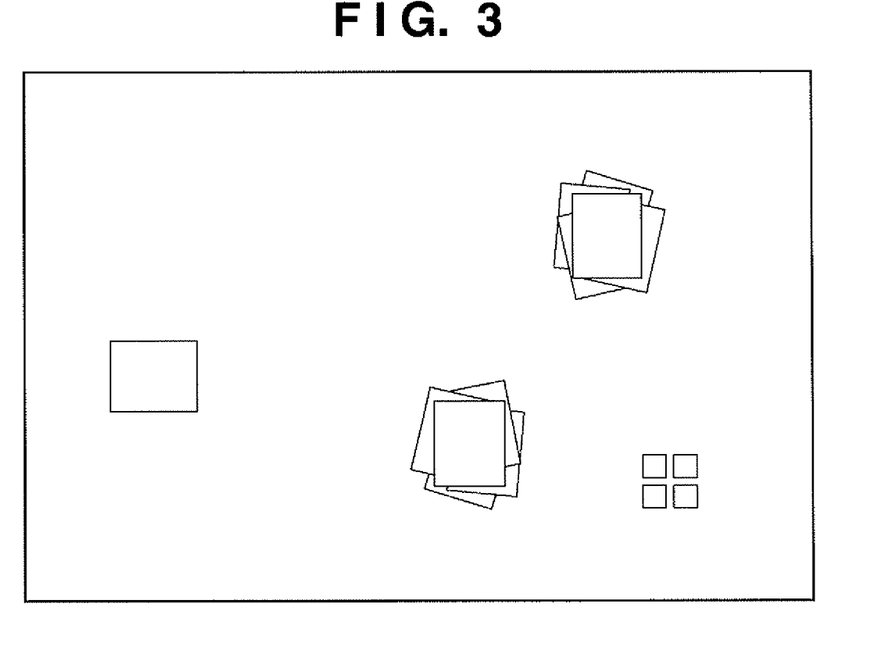
FIG. 3 is a view that illustrates a display screen example of a multi-touch panel.

FIG. 3 is a display screen example of the display 109 on which the display contents thereof are observed through the multi-touch panel 108. Objects such as images or characters are displayed on the screen. Depending on the operation performed by a user, an operation menu may also be displayed. After performing an operation to select an object, a user can perform an operation to give the instruction for a change in the display of the object, such as a shift, rotation, enlargement, or reduction, or an operation to execute or erase the object or the like. Objects can also be disposed in an overlapping manner, to resemble a situation in which the objects are real entities. A user gives the instruction for an operation by touching the multi-touch panel 108 with a finger. The multi-touch panel 108 can concurrently detect contact points that are touched by multiple fingers. According to the present invention, it is sufficient that multiple contact points can be detected concurrently, and the detection method (sensor) is not limited.

Figure 4:
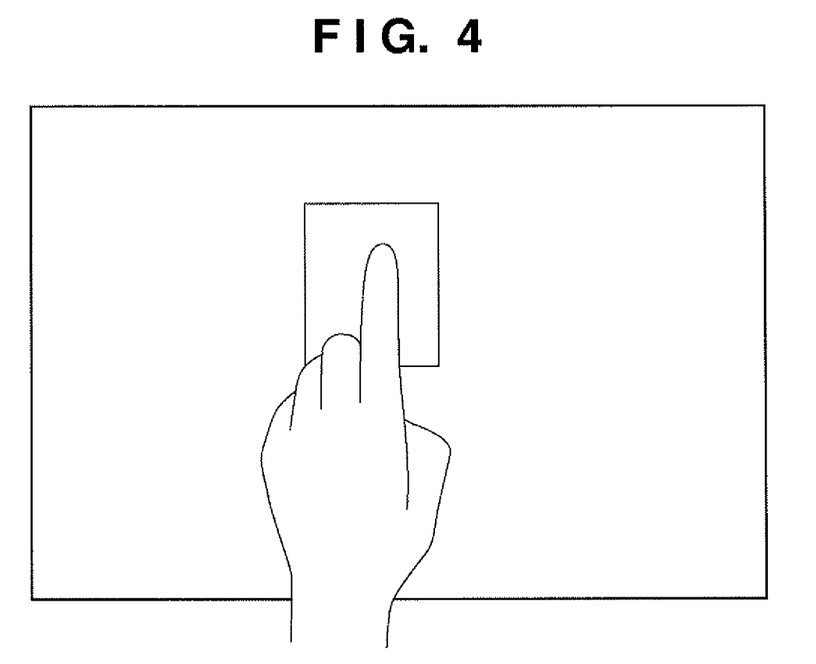
FIG. 4 is a view that illustrates an example of an operation by a user with respect to the multi-touch panel.

FIG. 4 is a view that shows an example of an operation by a user with respect to the multi-touch panel 108. The user selects an object by touching any one point thereof with a finger, and the user can shift the object by shifting (dragging) the object in that state in which the finger is touching the panel.

Figure 5:
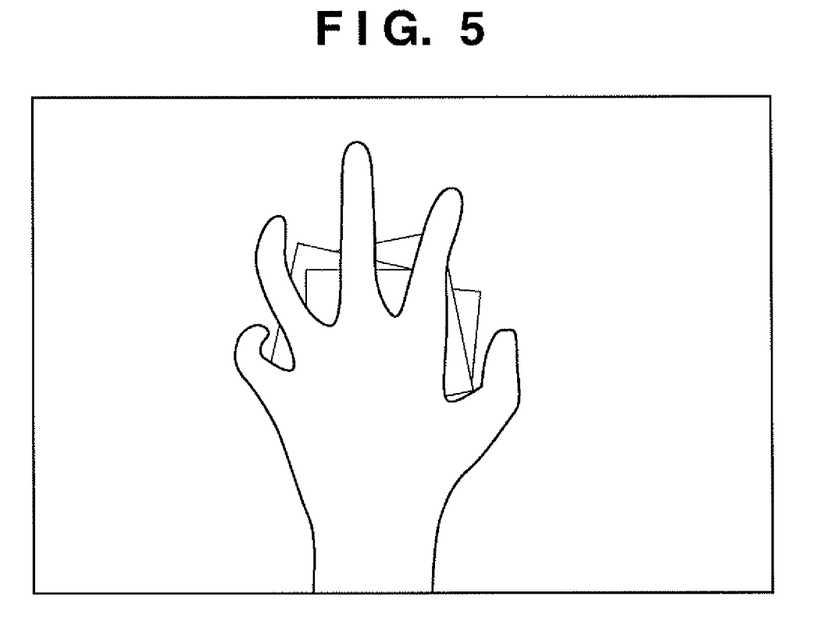
FIG. 5 is a view that illustrates an operation by a user for selecting objects in a case in which there are multiple objects.

FIG. 5 is a view that shows an example of an operation by a user for selecting objects in a case in which there is a plurality of objects. The user touches the multi-touch panel 108 with three or more fingers of one hand so as to surround the group of objects. Thus, a state is entered in which the entire group of objects inside the surrounded area is selected. Thereafter, an operation to shift the group of objects or the like is performed. For example, the group of objects can be shifted by dragging the group of objects in the same direction without significantly altering the positional relationship among the multiple fingers surrounding the group of objects. The group of objects may be displayed in an overlapping manner, or may be displayed without overlapping inside the surrounded area. Further, although the present method is particularly effective in a case in which there is a plurality of objects, the present method also functions in the case of a single object.

Figure 6:
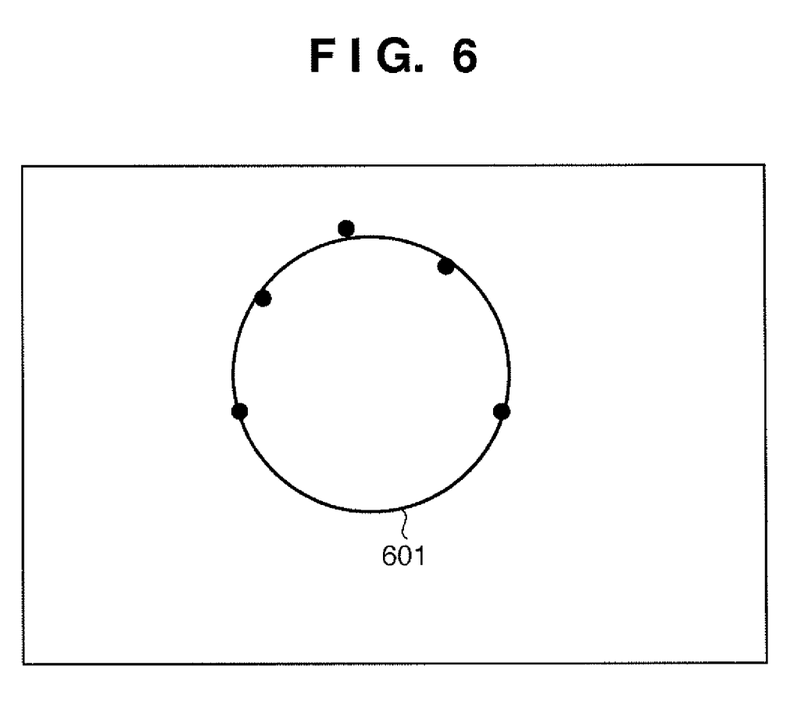
FIG. 6 is a view that illustrates contact points that are recognized with the touch panel when a user performs an operation to surround the objects in the example shown in FIG. 5.

FIG. 6 is a view that illustrates contact points that are recognized with the multi-touch panel 108 when a user surrounds objects using a hand in the example shown in FIG. 5. A circle 601 that passes through these contact points is a selected area. In the case shown in FIG. 6, although the contact points are only those of the fingers of one hand, in a case in which the information processing apparatus is being utilized by multiple people or a case in which a single user surrounds objects with both hands, the multi-touch panel 108 recognizes contact points that are produced by fingers of different hands. To enable a selection operation in that state also, processing is required that identifies a set of points produced by surrounding fingers of one hand among the contact points.

Figure 7:
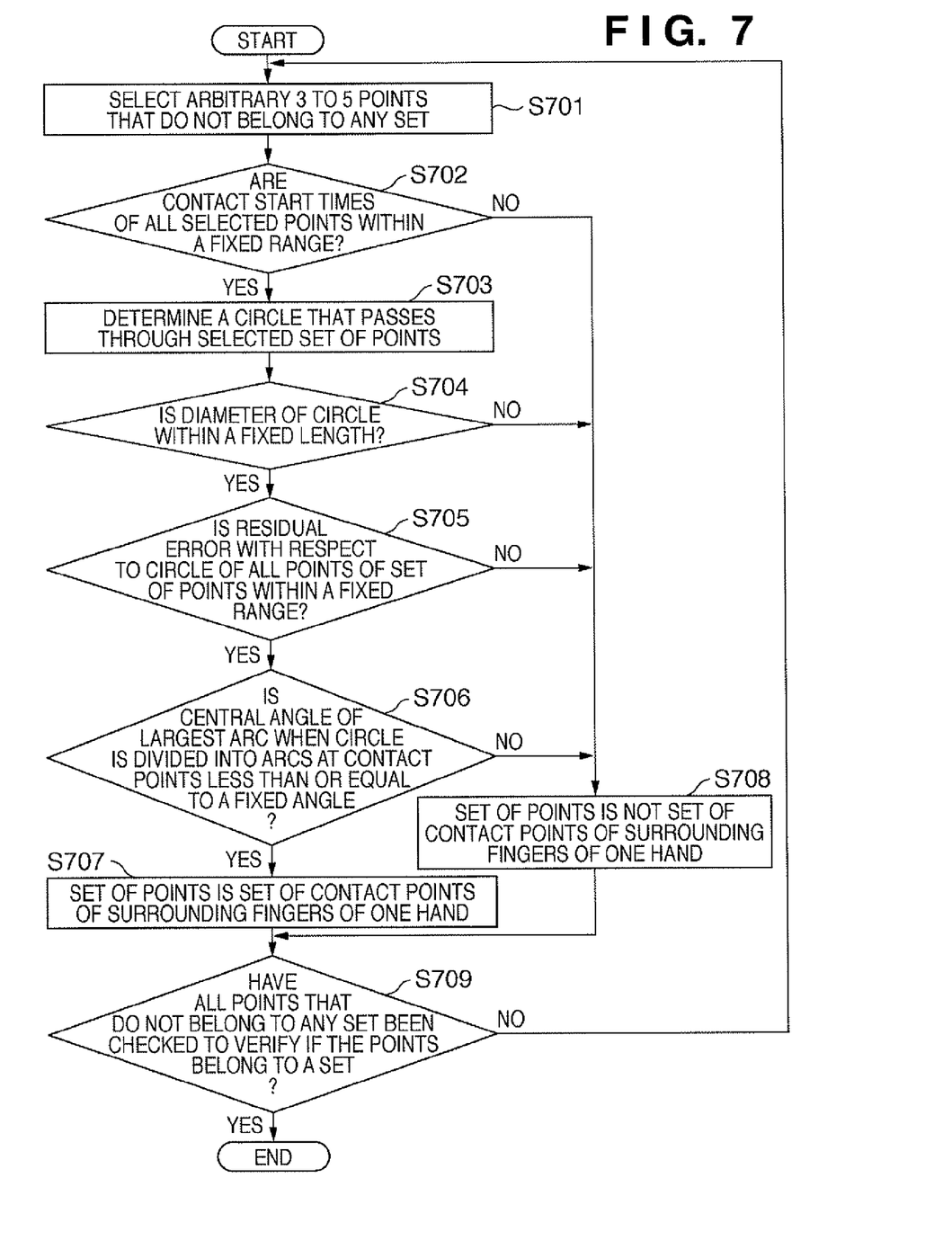
FIG. 7 is a flowchart that illustrates processing that identifies a set of points produced by surrounding fingers of one hand among contact points recognized with the multi-touch panel.

FIG. 7 is a flowchart that illustrates processing that identifies a set of points produced by surrounding fingers of one hand among contact points recognized with the multi-touch panel 108. The present processing is stored in the information processing apparatus as one part of an information processing program code, and is a part of an object selection process. The present processing may be periodically executed, or may be triggered by recognition of a new contact point.

First, the CPU 101 arbitrarily selects contact points of a number greater than or equal to three and less than or equal to five from the contact points (step S701). Thereafter, the CPU 101 judges whether or not the set of points selected in this step are produced by fingers of one hand. In this connection, when the processing of step S701 is performed a second and subsequent time, contact points that have already been determined to belong to any set (any set of contact points produced by fingers of one hand) are excluded from the objects for selection. To reduce recognition omissions, judgment with the largest set of points is performed first. When there are five contact points, first of all, those five points are judged, and if the five points do not constitute a set, an arbitrary set of four points are selected and judged, and if any four points also do not constitute a set, the CPU 101 selects an arbitrary set of three points to perform a judgment. If the number of contact points is two or less, the CPU 101 ends the present processing because three points or more cannot be selected. As described above, in step S701 the CPU 101 extracts combinations of touch input positions of a predetermined number from a plurality of touch input positions that concurrently exist on the touch panel (multi-touch panel 108). In this case, in order to detect an area designation made by one hand of a user, the predetermined number is at least any number between three and five.

Next, with respect to the combination of touch input positions extracted in step S701, the CPU 101 determines whether or not the combination is an area designation operation by a single user based on the positional relationship between the touch input positions (step S702 to S708). First, the CPU 101 examines the time that contact to the multitouch panel 108 started with respect to each of the points selected in step S701

(step S702). Unless the contact start times of all the selected points are within the range of a predetermined time limit, for example, within one second, the CPU 101 judges that the set of points is not a set of contact points produced by surrounding fingers of one hand (NO in step S702). This is a check that utilizes an operation rule that an operation to surround and select an object must be performed by almost concurrent contact of fingers against the touch panel. In this connection, if the time limit is made too short the judgment becomes strict, and even if a user performs a surrounding operation with one hand, it is difficult for the user's operation to be regarded as a surrounding operation. In contrast, if the time limit is made too long, differing operations are easily misrecognized as a surrounding operation. Accordingly, the time limit is set by taking into account a balance between these two aspects. In this connection, naturally a configuration may also be adopted that enables a user to set the time limit. When the contact start times are not within the range of the time limit, the CPU 101 judges that the relevant set of points is not a set of contact points produced by surrounding fingers of one hand (step S708).

If the contact start times are within the time limit range, next the CPU 101 determines a circle that passes through the selected set of points (step S703). When the selected points consist of four points or five points, in most cases it is not possible to determine a circle that passes exactly through all the points, and so the CPU 101 determines an approximated circle. Approximation of the circle is performed using a least-squares method. There are several methods available as methods of applying the least-squares method to a circle, and in this case a least-squares center method is used. The term "least-squares center method" refers to a method that determines a circle that minimizes a sum of the squares of distances between a line segment OC between a point O that is determined as the mean of the selected points and a selected point C, and BC that is determined based on an intersection point B with the determined circle. Although the least-squares center method is used according to the present embodiment, the present submission is not restricted to this method. Another method, for example, a least-squares method that minimizes a sum of the squares of differences between distances from a point O that is determined as the mean of the selected points and a selected point C, and the radius of the circle may also be used. Next, the CPU 101 examines whether or not the diameter of the determined circle is within the range of a predetermined threshold value, for example, within 30 cm (step S704). This is a check that utilizes a size of a human hand. This threshold value is also set as a value that is large enough for correct operations to be recognized and small enough to reduce misrecognitions. In this case, when the diameter of the circle exceeds the threshold value, the CPU 101 judges that the relevant set of points is not a set of contact points of surrounding fingers of one hand (step S708). In this connection, naturally, a configuration may also be adopted that enables the user to set the threshold value relating to the diameter of the circle.

When the diameter of the circle is within the threshold value range in step S704, the CPU 101 examines whether or not the size of a residual error (for example, a distance between the circumference of the approximate circle and a contact point) when the approximate circle is determined with the least-squares method is less than or equal to a threshold value (step S705). If the residual error exceeds the threshold value, the CPU 101 judges that the relevant set of points is not a set of contact points of surrounding fingers of one hand (step S708). This is a check that utilizes an operation rule that an operation to surround and select an object must be performed by approximately circular contact of fingers against the touch panel. This threshold value is also set as a value that is large enough for correct operations to be recognized and small enough to reduce misrecognitions. Naturally, a configuration may also be adopted that enables the user to set the threshold value relating to the residual error. In this connection, when a set of points consists of three points, the residual error of all the points is 0. Further, in the case of using the least-squares center method, judgment may be performed using circularity instead of residual error.

When the residual errors of all the points are inside the threshold value range, the CPU 101 next examines whether, when the circle is segmented into arcs at the contact points, the central angle of an arc that has the largest central angle is less than or equal to a predetermined angle (step S706). According to the present example, for example, the CPU 101 examines whether or not the central angle is less than or equal to 180°. Since the operation performed by fingers is to "surround" the circumference of an object, this is a check for excluding a state (operation) in which the circumference is not surrounded. If the central angle of the arc exceeds the predetermined angle, the CPU 101 judges that the relevant set of points is not a set of contact points of surrounding fingers of one hand (step S708).

The CPU 101 regards a set of points that has cleared all the checks of steps S702 and S704 to S706 as a set of contact points of fingers of one hand, that is, regards the set of points as an area designation operation (step S707). More specifically, the CPU 101 uses the following factors as conditions for determining whether or not the touch input positions constituting the combination extracted in step S701 is an area designation operation:

(1) that the times at which input of the respective touch input positions constituting the combination extracted in step S701 must be within a predetermined time range (S702);

(2) that a circle specified based on touch input positions constituting the combination must be less than or equal to a predetermined size (less than or equal to a predetermined diameter) (S704);

(3) that all the touch input positions constituting the combination can specify a circle such that a distance from the circumference of the circle is within a predetermined range (S705); and (4) that in a case in which the circumference of a circle that is specified based on the touch input positions constituting the combination is divided based on the touch input positions, central angles of all arcs produced by the dividing must be less than or equal to a predetermined size (S706).

The above processing is performed for combinations of all points that do not belong to a set of contact points (step S709). Since a single contact point is produced by a finger of a single user, as described above, in step S701 a point that is already regarded as a constituent point of a set of contact points is excluded from selection of a combination. When the CPU 101 has checked all the combinations, the present processing ends.

Figure 8:
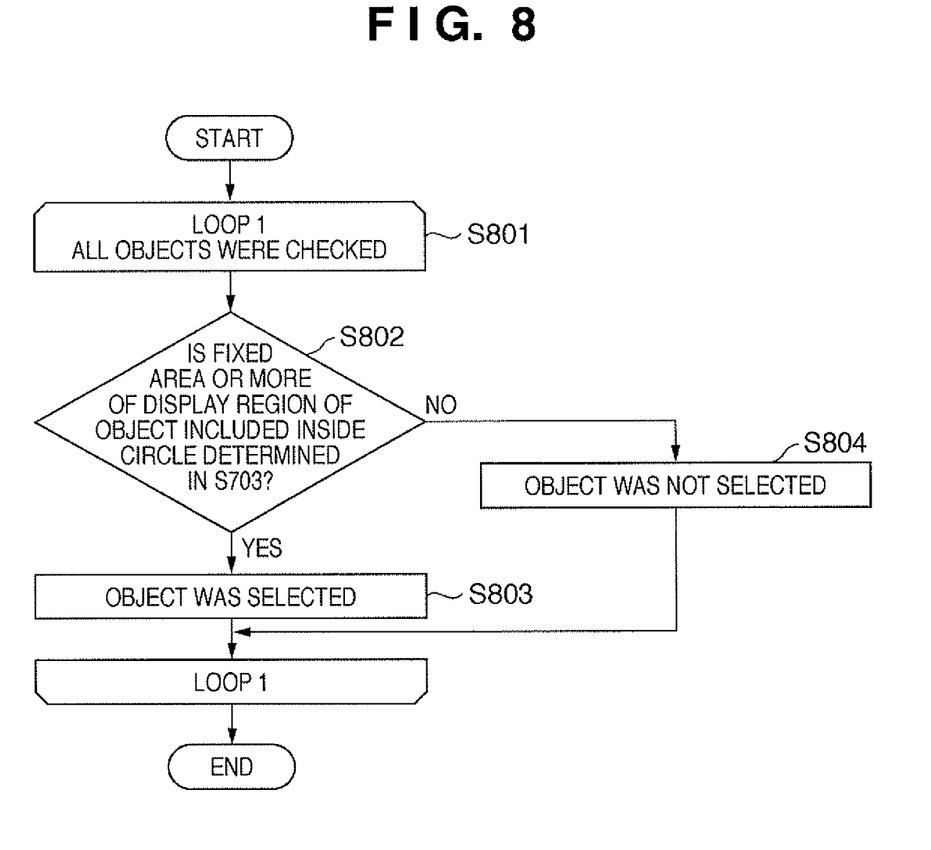
FIG. 8 is a flowchart of judgment processing for a surrounded object.

Based on the combination of touch input positions that is judged as being an area designation operation performed by a single user as described above, the CPU 101 determines an area that is specified by the relevant area designation operation. According to the present embodiment, the circle that is determined in step S703 is the specified area. The CPU 101 then acquires the selected object based on the relationship between the specified area and the display position of each object. Hereunder, this processing is described referring to FIG. 8. FIG. 8 is a flowchart that illustrates judgment processing that judges whether to regard any object among the objects displayed on the multi-touch panel 108 as a surrounded, that is, selected, object. The present processing is stored in the information processing apparatus 100 as one part of an information processing program code, and is one part of object selection processing that is executed by the CPU 101.

When sets of points have been found by the processing shown in FIG. 7, the present processing is executed for each set of points. The present processing is performed for all objects that are being displayed on the display 109 (step S801). According to the present embodiment, the CPU 101 examines whether or not a previously specified area or more, for example, 90% or more, of the display area of an object is included inside the circle that is determined by the processing of step S703 (step S802). If the previously specified area is included therein, the CPU 101 regards the object in question as being inside the region and thus regards the object as a selected object (step S803). In contrast, if the previously specified area or more of the display area of the object is not included inside the circle, the CPU 101 regards the object in question as not being inside the region, and thus regards the object as not being selected (step S804). In a case in which objects are being displayed in an overlapping manner, the CPU 101 makes a judgment based on the region of the entire object as displayed in a case in which objects are not overlapping. In this connection, the present method of judging whether or not an object is surrounded is one example, and the present invention is not limited thereto. For example, a method may also be used that checks that representative points of an object are all included inside the circle determined in step S703, more specifically, that distances between the center of the circle and representative points of the object are within the radius of the circle.

After selection of an object, an operation is performed so that the selected object is shifted or erased or the like. For example, an operation that is the same as in the case of an operation for a single object as shown in FIG. 4, such as touching any portion of the selected group of objects and dragging to thereby shift the group of objects, is also possible. Alternatively, the fingers that surround an object can also be utilized in that state for the next operation. For example, when all the contact points are dragged in the same direction without removing the fingers used for selection from the multi-touch panel 108, the information processing apparatus 100 recognizes that this is an operation to shift the selected group of objects. In this case, the information processing apparatus 100 shifts the selected group of objects in accompaniment with shifting of the contact points. In this connection, for example, if the amount of change in the area of a circle that is formed with the contact points is within a predetermined range, the information processing apparatus 100 determines that the fingers surrounding the object remain as they are.

At this time, the CPU 101 may also be configured to recognize a rotation operation. In this case, by rotating the contact points by taking the center of the circle as the selected area as an axis, the CPU 101 also rotates the selected object. The CPU 101 can also be configured to recognize enlargement and reduction operations. When each contact point is shifted to the same degree in a direction towards the center along a normal line of the circle as the selected area, the CPU 101 regards the operation as a reduction instruction and reduces the display of the group of objects. Conversely, when each contact point is shifted to the same degree in a direction towards the outside of the circle along a normal line of the circle, the CPU 101 regards the operation as an enlargement instruction and enlarges the display of the group of objects. These parallel shifting, rotation, enlargement, and reduction operations can be handled together as an affine transformation with respect to the object.

In the object selection processing according to the first embodiment, processing to recognize a set of points (step S702) was performed utilizing the operation rule that a operation that surrounds and selects an object must be performed by touching fingers approximately concurrently against a touch panel. According to the second embodiment, this operation rule is abolished, and accordingly a description is given of an embodiment in which the recognition processing of step S702 is abolished. Since there is no rule that fingers are brought in contact with the touch panel approximately concurrently, it is possible to select an object even by changing the position of fingers that are already contacting the touch panel to form a surrounding shape. According to the second embodiment, a condition for judging a new set of points is used instead of a contact start time. The new condition to be used is that the diameter of a circle derived from a set of points selected at a preceding arbitrary time is within a constant length, for example, within 30 cm. This is a condition that uses the past history of contact points to judge that contact points that were separated by large distances in the past are contact points that are produced by fingers of different hands. The second embodiment is the same as the first embodiment except for using this condition in place of step S702.

As described above, according to the second embodiment, based on a history up to the current time of touch input positions constituting a combination, it is determined whether or not the positional relationship of those touch input positions has deviated even once from a condition for determining that the touch input positions are an area designation operation of a single user. For example, it is determined whether or not the size of a circle specified by touch input positions constituting an extracted combination exceeds a predetermined size. As a result of the determination, if it is found that the positional relationship has deviated even once from a condition for determining that the combination is an area designation operation of a single user, it is determined that the touch input positions constituting the combination in question are not an area designation operation. Thus, according to the second embodiment, more flexibility can be provided with respect to the time at which touching starts than in the first embodiment.

According to the first embodiment and second embodiment, when judging whether or not a set of contact points is produced by surrounding fingers of one hand, the size (30 cm) of a hand of an average person is used as a judgment factor. According to the third embodiment, a method is described that uses information regarding the size of the hand of an operator. A difference from the first embodiment is that the third embodiment is configured to first transmit information relating to hand size to the information processing apparatus 100 before an operator starts an operation. As the method for transmitting information relating to hand size, a method is used that causes an operator to contact the palm of the hand and the palm side of the fingers (in a state in which the hand is open) against the multi-touch panel 108. When this gesture is performed, the information processing apparatus 100 reads in the contact information and stores the length of the five fingers as well as connecting position information with respect to the fingers and palm. The term "connecting position information with respect to the fingers and palm" refers to two-dimensional coordinate information for the base of the fingers when the palm is flat. In other words, this information serves as hand size information. This information is held inside the information processing apparatus 100 for a certain amount of time. Subsequently, when judging (step S704)

whether or not a set of contact points is produced by surrounding fingers of one hand, the hand size information that is held inside the information processing apparatus 100 at that time is used. More specifically, the CPU 101 detects the size of a user's hand that has been opened and placed on the multi-touch panel 108 in accordance with touch input signals from the panel. The CPU 101 then determines whether or not the size of a circle that has been set based on the touch input positions constituting the combination exceeds a size that is decided based on the hand size detected as described above using the conditions for determining an area designation operation. In this connection, a condition that arises from the fact that the fingers are those of one hand, such as a distance or a positional relationship between neighboring contact points, may be further incorporated into the recognition processing.

Further, a judgment in step S704 is not limited to a judgment that uses information regarding a hand size. For example, a configuration may be adopted so that positional relationships of contact points when operations to surround an object are performed by respective operators are held, and the similarity with the relevant positional relationship is used for judging whether or not a set of contact points is produced by surrounding fingers of one hand. More specifically, the CPU 101 causes a user to perform an area designation operation through the multi-touch panel 108, and holds a relative positional relationship of the touch input positions at that time in, for example, the RAM 103. Subsequently, the CPU 101 uses the similarity between the relative positional relationship of the touch input positions constituting the combination and the relative positional relationship held in the RAM 103 as a condition for determining whether or not an area designation operation is performed.

Further, in a case in which the multi-touch panel 108 uses an optical sensor method, since fingerprint information for fingers can also be obtained, a configuration may be adopted in which fingerprints are registered in advance and a set of contact points produced by surrounding fingers of one hand is determined using the fingerprint information. In this case, hand size information or the aforementioned positional relationship information is held in association with the fingerprints, and in step S704 the CPU 101 refers to the information that corresponds to the detected fingerprints to perform judgment. When fingerprint information has been obtained for all contact points, determination of a set of fingers of the same arm of the same user can be performed by matching only the fingerprints, and when fingerprint information is obtained for only one portion of the contact points, the positional relationship between the fingers is used as a judgment factor. For example, when the fingerprints of the ring finger and the little finger are obtained in an aligned state, a judgment that a contact point that is on the opposite side to the contact point of the ring finger that is adjacent to the contact point of the little finger is not a contact point produced by a finger of the same arm can be made based on the structure of the hand.

Although according to the first to third embodiments the CPU 101 judges whether or not an operation is performed by the fingers of one hand based only on information regarding contact to the multi-touch panel 108, according to the fourth embodiment a method is described that judges a combination using sensor information other than contact information.

(1) First, a method can be mentioned that decides whether a set of contact points is produced by fingers of one hand using image information that is obtained from an image sensor. For example, a camera is provided at a position that can photograph a hand of an operator, the position of the hand of the operator is judged based on the image taken by the camera, and the positional information is used in judging the contact point information. A similar judgment can also be performed using an infrared sensor.

(2) Further, when the multi-touch panel 108 uses an optical sensor method, by also utilizing read-in information other than contact points, a method can be utilized that decides whether or not an object that corresponds to a palm exists at a portion at which a palm derived from the contact points should be. Information relating to fingers at a portion that is not being contacted can also be utilized.

(3) A method can also be considered that judges whether a set of contact points is produced by fingers of one hand based on information from a position sensor. For example, by causing an operator to put gloves that contain a built-in position sensor on each hand, the information from the gloves can be used in judging the contact point information.

As described above, according to the fourth embodiment, the CPU 101 utilizes the position of a hand of a user that is detected using a sensor that is different from the multi-touch panel 108 when extracting a combination of touch input positions in step S701. Therefore, since a combination of touch inputs produced by one hand of a single user can be extracted more exactly, the efficiency of the determination processing shown in FIG. 7 is improved. This is because, when selecting contact points as candidates for a set in step S701, it is easier to discover contact points that are not fingers of the same arm based on the position of the hand of the user that is obtained, and thus the combinations that should be recognized as candidates for a set are reduced.

According to the first embodiment, it is only possible to select a region of a size surrounded by one hand, because of the judgment in step S704. According to the fifth embodiment, a method is described that enables selection of a larger region by adding processing that recognizes a new gesture to the processing of the first embodiment.

According to the first embodiment, after a selection operation, when each contact point is shifted to the same degree towards the outside of the circle along a normal line of the circle, the CPU 101 regards the operation as an instruction to enlarge the object display. According to the fifth embodiment, that kind of operation is not regarded as an instruction to enlarge the object display, and instead is regarded as an instruction to enlarge the selected area. At this time, when deciding the enlargement ratio from the contact points, naturally a region of a size that is greater than a size that can be expressed with one hand cannot be instructed. Therefore, the size of a region that is initially surrounded is stored, and thereafter, when the surrounded region is widened by an amount greater than or equal to a fixed amount by shifting the contact points, the CPU 101 regards the operation as an instruction to enlarge the region and performs enlargement processing that gradually enlarges the surrounded region. Thereafter, if an operator returns the size of the region to approximately the size of the initially surrounded region, the CPU 101 stops the enlargement processing. Conversely, when a region is narrowed by an amount greater than or equal to a fixed amount from the initial size of the region, the CPU 101 regards the operation as an instruction to reduce the region and gradually reduces the region in question. Subsequently, if an operator returns the size of the region to approximately the size of the initially surrounded region, the CPU 101 stops the reduction processing. By means of the above processing, an information processing apparatus can be realized that also has a function for selecting a region that exceeds a size surrounded by one hand.

Although according to the first embodiment, processing that classifies all of the contact points into set of points that surround a region with one hand is performed as the initial processing of the object selection processing, the present invention is not limited thereto. For example, a procedure may be adopted in which, first, all of the contact points are grouped into sets of contact points produced by fingers of the same hand, and then the CPU 101 judges whether or not each set of points is a surrounded shape. In this case, in addition to the fact that, naturally, the positions of the contact points for grouping will be close, the fact that if contact points are produced by fingers of the same hand the contact points will be distributed in an area contained inside a circle with a diameter of, at most, approximately 30 cm, and the fact that contact points produced by one hand will be no more than five points can be used for the grouping judgment. If information regarding the number of operators can be obtained, since sets are equivalent to a number of hands, the fact that the number of sets must be equal to or less than twice the number of operators can also be utilized for the judgment. More specifically, the number of users is registered in advance, and in step S701, a combination of touch inputs is extracted that takes the upper limit of combinations as being twice the number of registered users. According to this processing, useless extraction of combinations can be prevented and the processing efficiency can be enhanced. For example, in a case in which the number of users is five people, the upper limit for the number of hands, that is, the number of sets of contact points, is ten. Since combinations from which a number of sets greater than ten can be obtained contradict the information for the upper limit of the number of hands, judgment of sets is not performed for such combinations.

Figure 9:
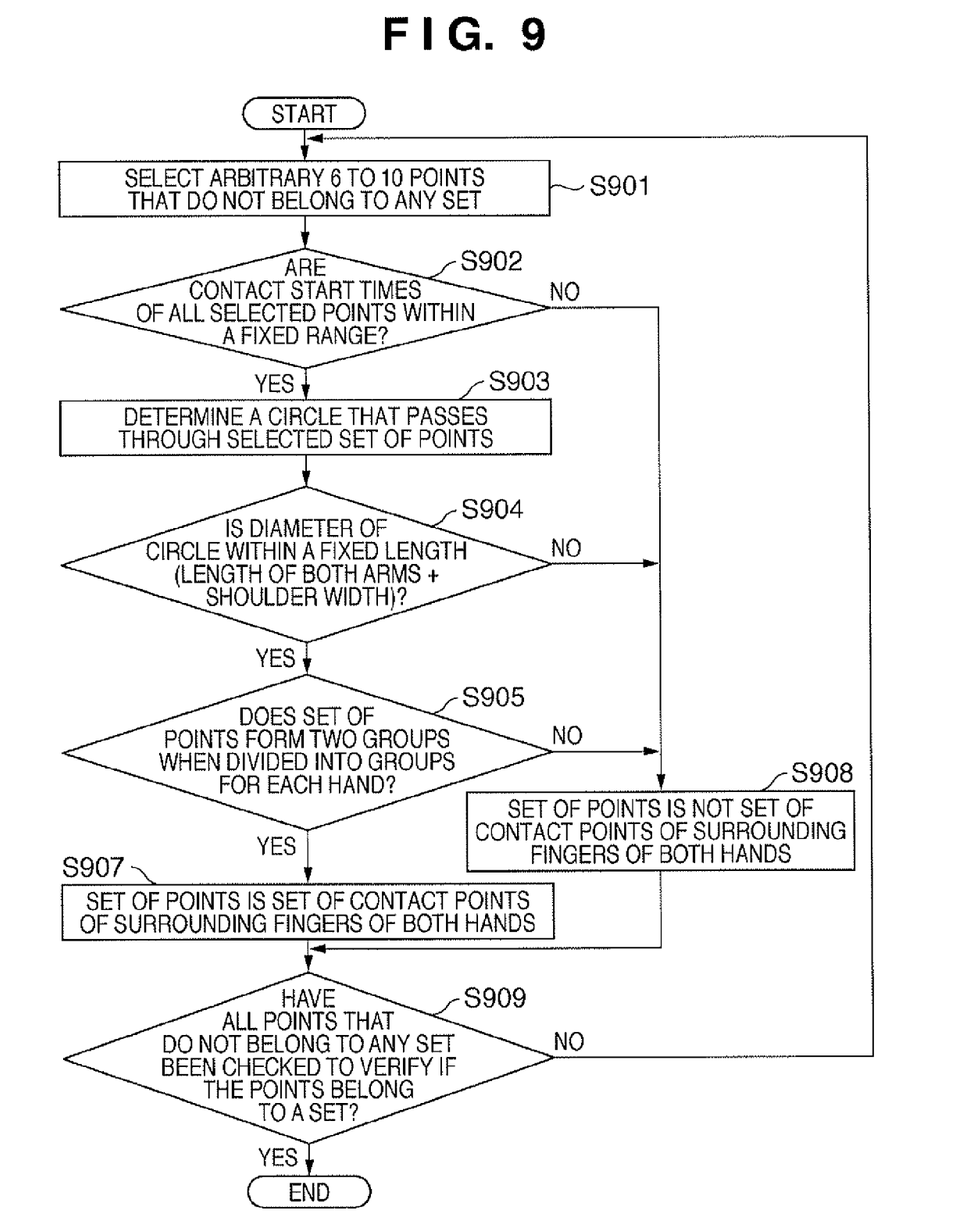
FIG. 9 is a flowchart that illustrates processing that identifies a set of points produced by surrounding fingers of both hands among contact points recognized with the multi-touch panel.

According to the seventh embodiment, a method is described that judges a region that is surrounded by both hands of a single user as a selected area. FIG. 9 is a flowchart that illustrates processing that identifies a set of points produced by surrounding fingers of both hands among contact points that are recognized with the multi-touch panel 108. In this case, the limiting conditions for finding contact points produced by a single user are less than those for the fingers of one hand (FIG. 7). For example, the following are conditions that can be utilized:

that contact points must be produced by approximately concurrent contact (step S902);
that when the contact points are grouped, there must be groups in two places that represent a group for each hand (step S905); and
that a distance between the contact points must be less than or equal to the length of both arms plus the shoulder width (step S904).

For the length of both arms and the shoulder width, general size information may be used, or the relevant information for an operator can be registered in advance and utilized. When utilizing other sensor information, as in the fourth embodiment, it may be possible to utilize recognition information such as the position of the body, the position of arms, and the position of the head. In this connection, the method described with respect to step S703 can be utilized as a method of determining a circle in step S903. When the conditions of the above described steps S902, S904, and S905 are satisfied, it is judged that the set of contact points selected in step S901 is a set of contact points produced by surrounding fingers of both hands (step S907). In contrast, if even any one of the conditions of the above described steps S902, S904, and S905 is not satisfied, it is judged that the set of contact points selected in step S901 is not a set of contact points produced by surrounding fingers of both hands (step S908). The processing of steps S901 to S908 is performed for combinations of all points that do not belong to a set of contact point (step S909).

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

According to the above-described embodiments, a region selected by a single user can be recognized as a selected area. The information processing apparatus does not misrecognize operations by multiple people and operations with both hands as selection operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-132358, filed May 20, 2008, which is hereby incorporated by reference herein in its entirety.

What is claimed is:

1. An information processing apparatus, comprising:
a touch screen constructed to detect a plurality of touch input positions concurrently;
an extraction unit configured to extract a combination consisting of a predetermined number of touch input positions from a plurality of touch input positions that concurrently exist on said touch screen;
a determination unit configured to determine whether or not a combination that is extracted by said extraction unit is an area designation operation performed by a single user based on a positional relationship among touch input positions comprising the combination;
a decision unit configured to decide a designated area based on touch input positions of the combination in a case in which it is determined that the combination is the area designation operation; and
an acquisition unit configured to acquire an object displayed on the touch screen as a selected object, which overlaps with the designated area at least in a portion,
wherein said extraction unit and said determination unit repeat processing using a reduced predetermined number, for touch input positions other than touch input positions constituting the combination determined to be the area designation operation, and
wherein the determination unit uses a condition that a history until a current time point of touch input positions comprising the combination must not deviate even once from a condition for determining that a positional relationship of the touch input positions is an area designation operation of a single user, which designates an area smaller than a predetermined size, as a condition for making the determination.

2. The information processing apparatus according to claim 1, wherein said determination unit uses a condition that times at which input of the respective touch input positions comprising the combination start must be within a predetermined time range as a condition for making the determination.

3. The information processing apparatus according to claim 1, wherein said determination unit specifies a circle based on three, four or five touch input positions comprising the combination, and determines that the combination is the area designation operation in case that the circle is less than or equal to a predetermined size defined based on a size of a human hand.

4. The information processing apparatus according to claim 3, wherein in a case in which a circumference of the circle is divided based on the touch input positions, said determination unit uses a condition that central angles of all arcs produced by the dividing must be less than or equal to a predetermined size as a condition for making the determination.

5. The information processing apparatus according to claim 1, wherein said determination unit uses a condition that all touch input positions comprising the combination can specify a circle for which a distance from a circumference of the circle is within a predetermined range as a condition for making the determination.

6. The information processing apparatus according to claim 1, further comprising:
a holding unit configured to cause a user to perform an area designation operation through said touch screen, and hold a relative positional relationship of touch input positions at that time;
wherein said determination unit uses a similarity between a relative positional relationship of touch input positions comprising the combination and a relative positional relationship that is held by said holding unit as a condition for making the determination.

7. The information processing apparatus according to claim 1, wherein said extraction unit extracts a number of touch input positions that is at least any number between three and five from the multiple touch inputs as the combination.

8. The information processing apparatus according to claim 1, wherein said extraction unit detects a position of a hand of a user by means of a sensor that is different from said touch screen, and extracts the combination based on a position of a hand that is detected.

9. The information processing apparatus according to claim 1, further comprising:
a change unit that, in a case in which said determination unit determines that the combination is an area designation operation, is configured to perform enlargement or reduction of a region in accordance with a gesture that enlarges or reduces a region that is decided by touch input positions comprising the combination at a time of the relevant determination.

10. The information processing apparatus according to claim 1, further comprising:
a registration unit configured to register a number of users;
wherein said extraction unit extracts a predetermined number of touch input positions that exist inside a predetermined area as the combination, and a number of combinations to be extracted is less than or equal to twice a number of users registered in the registration unit.

11. The information processing apparatus according to claim 1, further comprising:
an operation unit that parallelly shifts, rotates, enlarges, or reduces an object acquired by said acquisition unit, by parallelly shifting, rotating, enlarging, or reducing touch input positions comprising the combination.

12. The apparatus according to claim 1, wherein the acquiring unit acquires an object that overlaps with the designated area in more than a predetermined area, and
in a case in which objects are being displayed in an overlapping manner, the acquiring unit determines an overlapping area between the object and the designated area by using an entire object as displayed in a case in which the object is not overlapping.

13. The apparatus according to claim 1, wherein said determination unit determines, based on the positional relationship among touch input positions comprising the combination extracted by said extraction unit, whether or not the combination is an area designation operation performed by a single hand of a single user, which designates an area smaller than a predetermined size that is predefined based on a size of human hand.

14. An information processing apparatus comprising:
a touch screen constructed to detect a plurality of touch input positions concurrently;
an extraction unit configured to extract a combination consisting of a predetermined number of touch input positions from a plurality of touch input positions that concurrently exist on said touch screen;
a determination unit configured to determine whether or not a combination that is extracted by said extraction unit is an area designation operation performed by a single user based on a positional relationship among touch input positions comprising the combination;
a decision unit configured to decide a designated area based on touch input positions of the combination in a case in which it is determined that the combination is the area designation operation;
an acquisition unit configured to acquire an object displayed on the touch screen as a selected object, which overlaps with the designated area at least in a portion, and
a detection unit configured to detect a size of a hand of a user through said touch screen,
wherein said extraction unit and said determination unit repeat processing using a reduced predetermined number, for touch input positions other than touch input positions constituting the combination determined to be the area designation operation, and
wherein said determination unit uses a condition that a size of a circle that is set based on touch input positions comprising the combination must not exceed a size that is decided based on a size of a hand that is detected by said detection unit as a condition for making the determination.

15. A control method of an information processing apparatus equipped with a touch screen constructed to detect a plurality of touch input positions concurrently, said control method comprising:
extracting a combination consisting of a predetermined number of touch input positions from a plurality of touch input positions that concurrently exist on said touch screen;
determining whether or not a combination that is extracted in said extraction step is an area designation operation performed by a single user based on a positional relationship of touch input positions comprising the combination;
deciding a designated area based on touch input positions of the combination in a case in which it is determined that the combination is the area designation operation; and
acquiring an object displayed on the touch screen as a selected object, which overlaps with the designated area at least in a portion,
wherein the step of extracting and the step of determining are repeated using a reduced predetermined number, for touch input positions other than touch input positions constituting the combination determined to be the area designation operation, and
wherein the step of determining uses a condition that a history until a current time point of touch input positions comprising the combination must not deviate even once from a condition for determining that a positional relationship of the touch input positions is an area designation operation of a single user, which designates an area smaller than a predetermined size, as a condition for making the determination.

16. A non-transitory computer readable storage medium that stores a program that causes a computer to execute a control method for an information processing apparatus equipped with a touch screen constructed to detect a plurality of touch input positions concurrently, wherein said program causes the computer to execute a control method comprising:
extracting a combination consisting of a predetermined number of touch input positions from a plurality of touch input positions that concurrently exist on said touch screen;
determining whether or not a combination that is extracted in said extraction step is an area designation operation performed by a single user based on a positional relationship of touch input positions comprising the combination;
deciding a designated area based on touch input positions of the combination in a case in which it is determined that the combination is the area designation operation; and
acquiring an object displayed on the touch screen as a selected object, which overlaps with the designated area at least in a portion,
wherein the step of extracting and the step of determining are repeated using a reduced predetermined number, for touch input positions other than touch input positions constituting the combination determined to be the area designation operation, and
wherein the step of determining uses a condition that a history until a current time point of touch input positions comprising the combination must not deviate even once from a condition for determining that a positional relationship of the touch input positions is an area designation operation of a single user, which designates an area smaller than a predetermined size, as a condition for making the determination.

17. A control method of an information processing apparatus equipped with a touch screen constructed to detect a plurality of touch input positions concurrently, said control method comprising:
extracting a combination consisting of a predetermined number of touch input positions from a plurality of touch input positions that concurrently exist on said touch screen;
determining whether or not a combination that is extracted in said extraction step is an area designation operation performed by a single user based on a positional relationship of touch input positions comprising the combination;
deciding a designated area based on touch input positions of the combination in a case in which it is determined that the combination is the area designation operation;
acquiring an object displayed on the touch screen as a selected object, which overlaps with the designated area at least in a portion; and
detecting a size of a hand of a user through said touch screen,
wherein the step of extracting and the step of determining are repeated using a reduced predetermined number, for touch input positions other than touch input positions constituting the combination determined to be the area designation operation, and
wherein the step of determining uses a condition that a size of a circle that is set based on touch input positions comprising the combination must not exceed a size that is decided based on a size of a hand that is detected in the step of detecting as a condition for making the determination.

18. A non-transitory computer readable storage medium that stores a program that causes a computer to execute a control method for an information processing apparatus equipped with a touch screen constructed to detect a plurality of touch input positions concurrently, wherein said program causes the computer to execute a control method comprising:
- extracting a combination consisting of a predetermined number of touch input positions from a plurality of touch input positions that concurrently exist on said touch screen;
- determining whether or not a combination that is extracted in said extraction step is an area designation operation performed by a single user based on a positional relationship of touch input positions comprising the combination;
- deciding a designated area based on touch input positions of the combination in a case in which it is determined that the combination is the area designation operation;
- acquiring an object displayed on the touch screen as a selected object, which overlaps with the designated area at least in a portion; and
- detecting a size of a hand of a user through said touch screen,
- wherein the step of extracting and the step of determining are repeated using a reduced predetermined number, for touch input positions other than touch input positions constituting the combination determined to be the area designation operation, and
- wherein the step of determining uses a condition that a size of a circle that is set based on touch input positions comprising the combination must not exceed a size that is decided based on a size of a hand that is detected in the step of detecting as a condition for making the determination.

* * * * *